United States Patent
Schumm, Jr.

(10) Patent No.: US 9,252,467 B2
(45) Date of Patent: Feb. 2, 2016

(54) FLUID REGULATING MICROVALVE ASSEMBLY FOR FLUID CONSUMING CELLS WITH SPRING-LIKE SHAPE-RETAINING APERTURE COVER

(76) Inventor: Brooke Schumm, Jr., Bay Village, OH (US)

( * ) Notice: Subject to any disclaimer, the term of this patent is extended or adjusted under 35 U.S.C. 154(b) by 1043 days.

(21) Appl. No.: 13/350,727

(22) Filed: Jan. 13, 2012

(65) Prior Publication Data
US 2012/0208102 A1 Aug. 16, 2012

Related U.S. Application Data

(63) Continuation-in-part of application No. 11/909,358, filed as application No. PCT/US2006/010106 on Mar. 21, 2006, now abandoned.

(60) Provisional application No. 60/596,373, filed on Sep. 20, 2005, provisional application No. 60/594,225, filed on Mar. 21, 2005, provisional application No. 60/594,227, filed on Mar. 21, 2005.

(51) Int. Cl.
*H01M 12/04* (2006.01)
*H01M 12/08* (2006.01)
*H01M 8/04* (2006.01)
*H01M 10/42* (2006.01)
*H01M 10/48* (2006.01)
*H01M 12/06* (2006.01)
*F16K 99/00* (2006.01)

(52) U.S. Cl.
CPC ........... *H01M 12/08* (2013.01); *F16K 99/0005* (2013.01); *F16K 99/0007* (2013.01); *F16K 99/0015* (2013.01); *F16K 99/0044* (2013.01); *H01M 8/04089* (2013.01); *H01M 10/425* (2013.01); *H01M 10/48* (2013.01); *H01M 12/06* (2013.01); *H01M 8/04388* (2013.01); *H01M 8/04395* (2013.01); *H01M 8/04753* (2013.01); *Y02E 60/50* (2013.01)

(58) Field of Classification Search
CPC ........................................................ H01M 12/04
See application file for complete search history.

(56) References Cited

U.S. PATENT DOCUMENTS 6,350,537 B1 * 2/2002 Pedicni ............... H01M 2/0452
429/406

* cited by examiner

*Primary Examiner* — Jacob Marks
(74) *Attorney, Agent, or Firm* — Brooke Schumm, III; Daneker, McIntire, Schumm, Prince, Manning & Widmann, P.C.

(57) ABSTRACT

A fluid regulating microvalve assembly for use to control fluid flow to a fluid consuming electrode, such as an oxygen reduction electrode, in an electrochemical cell is proposed. The microvalve assembly includes a stationary valve body having an aperture and microactuators movable from a first closed aperture position to at least a second position where fluid is able to pass through the microvalve body aperture. These microactuators control the movement of spring-like shape-retaining interior aperture covers, which covers can be belleville springs or flat springs. The fluid regulating microvalve assembly can utilize cell potential or a separate source. The latter assembly can be located outside or inside the cell housing, for example between a fluid inlet aperture and the fluid consuming electrode. Using a printing process to deposit at least one of the layers is proposed for making the multilayer microvalve assembly for a fluid depolarized battery.

21 Claims, 4 Drawing Sheets

FLUID REGULATING MICROVALVE ASSEMBLY FOR FLUID CONSUMING CELLS WITH SPRING-LIKE SHAPE-RETAINING APERTURE COVER

CROSS-REFERENCE TO RELATED APPLICATIONS

This application is a continuation-in-part of, and claims priority and benefit from, U.S. application Ser. No. 11/909,358 filed Sep. 21, 2007 now abandoned, which claims priority from PCT/US06/10106 filed Mar. 21, 2006 which in turn claimed priority from U.S. Provisional Applications 60/596,373 filed Sep. 20, 2005, 60/594,225 filed Mar. 21, 2005, and 60/594,227 filed Mar. 21, 2005. All of these applications are incorporated by reference, including the text, description, claims and drawings.

FIELD OF THE INVENTION

The present invention relates to improved fluid regulating microvalve assemblies adapted to control the rate of flow of one or more fluids, particularly a gas, between an interior and an exterior of a cell housing of a cell, such as a fuel cell or battery that is preferably air-depolarized or air-assisted, as well as fuel cells and batteries containing the fluid regulating microvalve assemblies. Methods for preparing fluid regulating microvalve assemblies and cells containing the improved microvalve assemblies are disclosed.

BACKGROUND OF THE INVENTION

Electrochemical battery cells that use a fluid, such as oxygen or other gas(es), from outside the cell as an active material to produce electrical energy, such as air-depolarized, air-assisted and fuel cell battery cells, can be used to power a variety of electronic devices. For example, air containing oxygen enters into an air-depolarized or air-assisted cell, where it can be used as, or can recharge, the positive electrode active material. The oxygen reduction electrode promotes the reaction of the oxygen with the cell electrolyte and, ultimately the oxidation of the negative electrode active material with the oxygen. The material in the oxygen reduction electrode that promotes the reaction of oxygen with the electrolyte is often referred to as a catalyst. However, some materials used in oxygen reduction electrodes are not true catalysts because they can be at least partially reduced, particularly during periods of relatively high rate discharge. They can also be recharged by an outside power source.

One type of air-depolarized cell is a zinc/air cell. This type of cell uses zinc as the negative electrode active material and has an aqueous alkaline (e.g., KOH) electrolyte. Manganese oxides that can be used in zinc/air cell air electrodes are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest. Some of these manganese dioxides as well as the zinc negative electrode material can be recharged by power supplied from outside the zinc air or fuel cell.

Another type of air-depolarized cell is a lithium/air cell. This type of cell uses lithium as the negative electrode active material and has an aqueous or a organic liquid or solid electrolyte. Manganese oxides that can be used in lithium/air cell electrodes are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest.

Air-assisted cells are hybrid cells that contain consumable positive and negative electrode active materials as well as an oxygen reduction electrode. The positive electrode can sustain a high discharge rate for a significant period of time, but through the oxygen reduction electrode, oxygen can only partially but significantly recharge the positive electrode during periods of lower or no discharge, so oxygen can be used for a substantial portion of the total cell discharge capacity. This means the amount of positive electrode active material put into the cell can be reduced and the amount of negative electrode active material can be increased to increase the total cell capacity in the standard volume for each size cell. Examples of air-assisted cells are disclosed in U.S. Pat. No. 6,383,674 and U.S. Pat. No. 5,079,106.

An advantage of air-depolarized, air-assisted and fuel cells is their high energy density, since at least a portion of the active material of at least one of the electrodes comes from or is regenerated by a fluid (e.g., a gas) from outside the cell. For zinc air cells another advantage is that they can be recharged for a number of cycles depending on previous discharge history and recharging voltage and current characteristics.

A disadvantage of these cells is that the maximum discharge rates they are capable of can be limited by the rate at which oxygen can enter the oxygen reduction electrode. In the past, efforts have been made to increase the rate of oxygen entry into the oxygen reduction electrode and/or control the rate of entry of undesirable gases, such as carbon dioxide, that can cause wasteful reactions. The cell performance can also depend on the rate of water entry or loss, which in turn depends on the relative water vapor partial pressures outside and inside the cell. The reaction products and increased water can fill void space in the cell intended to accommodate the increased volume of discharge reaction products or dry the cell out, respectively. Examples of these approaches can be found in U.S. Pat. Nos. 6,558,828; 6,492,046; 5,795,667; 5,733,676; U.S. Patent Publication No. 2002/0150814; and International Patent Publication No. WO 02/35641. However, changing the diffusion rate of one of these gases generally affects the others as well.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans have been used to force air into cells (e.g., U.S. Pat. No. 6,500,575), but fans and controls for them can add cost and complexity to manufacturing, and fans, even micro fans, can take up valuable volume within individual cells, multiple cell battery packs and devices. They also increase the continuous parasitic current required.

Another approach that has been proposed is to use microvalves to control the amount of air entering the cells (e.g., U.S. Pat. No. 6,641,947 and U.S. Patent Publication No. 2003/0186099).

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508).

Additional approaches utilizing microvalves to control the amount of gas entering a cell are set forth in U.S. Pat. Nos.

5,304,431; 5,449,569; 5,541,016; and 5,837,394; incorporated herein by reference, wherein the microvalves are formed utilizing a silicon or semiconductor substrate and etching, deposition and micromachining processes.

Microactuators are further described in U.S. Pat. Nos. 4,969,938; 5,069,419; 5,271,597; and publications such as "Fluister: semiconductor microactuator" described in Instruments and Apparatus News (IAN), October 1993, p. 47, and Electronic Design, Nov. 1, 1993, p. 3.

SUMMARY OF THE INVENTION

In view of the above, it is an object of the present invention to provide an improved low cost, reliable fluid regulating microvalve assembly that is relatively inexpensive and straightforward to produce.

A further object is to provide a fluid regulating microvalve assembly that is relatively small in size and takes up little volume in a cell in which the microvalve assembly is incorporated, thereby maximizing volume for energy producing components.

Another object of the invention is to provide a cell, particularly a fuel cell or battery with a fluid consuming positive electrode, preferably an oxygen reduction electrode and a fluid regulating microvalve assembly that allows high rate discharge of the cell with relatively low or even no capacity loss during periods of low rate or no discharge.

Yet another object of the invention is to provide a multilayer microvalve assembly that can have a complex configuration and be efficiently and economically produced at high speeds, preferably utilizing a printing process during at least one step utilized to form the microvalve assembly.

Accordingly, one aspect of the invention is a microvalve assembly for an electrochemical cell, comprising a stationary microvalve body comprising a metal layer, polymer, elastomer or rubber layers and an aperture located between a first surface and a second surface; and an improved movable microactuator connected to the microvalve body and capable of moving a sealing member between a first position where fluid cannot pass through the microvalve body aperture and a second position which allows fluid to pass through the microvalve body aperture, and wherein the microactuator is thermally actuated. The improvement consists of taking advantage of the properties of a belleville disc (a type of flip spring), a belleville style linear spring that retains its shape after being flipped, sometimes called a flip spring or flip spring strip, (sometimes called "spring-like shape-retaining aperture covers"), or a flat spring all of which are situated to function to alternately occlude and permit fluid to pass through the microvalve assembly into the cell (sometimes collectively "spring valves" or "spring aperture covers") and to provide more positive sealing when the cell is not in use in a simpler assembly with at least one printed layer for, especially, moving the microactuators to move the spring valves in the one or more microvalve assemblies.

Another aspect of the invention is an electrochemical cell, comprising a housing including one or more fluid inlet apertures, a negative electrode, a fluid consuming positive electrode, and one or more microvalve assemblies operatively connected to the one or more fluid inlet apertures for controlling passage of fluid to the fluid consuming positive electrode, wherein the microvalve assembly comprises (a) a stationary microvalve body comprising metal, polymer, elastomer or rubber layers and an aperture located between a first surface and a second surface; and (b) a tiny movable belleville disc,), or a belleville style linear spring, or a flat spring any of which are manipulated by one or more microactuators connected to the microvalve body and capable of moving between a first position where fluid cannot pass through the microvalve body aperture and a second position which allows fluid to pass through the microvalve body aperture.

Yet another aspect of the invention is a method for preparing a microvalve assembly, comprising the steps of forming a microvalve body having one or more layers; forming a microactuator having one or more deposited layers; and operatively joining the microvalve assembly to the microactuator, wherein the microvalve assembly comprises an aperture or apertures that extend through the assembly from a first surface to a second surface, wherein the forming of the one or more microvalve assembly, microactuator or microactuator layers, or both, or all, includes utilizing a printing process, and wherein the two or more microactuators are operatively connected to the microvalve assembly and capable of moving a spring-like shape-retaining valve that functions as an interior aperture or inlet cover such as a belleville spring disk, flat spring, or flip spring strip, between a first position where fluid cannot pass through the microvalve body aperture, port or inlet, and a second position which allows fluid to pass through the apertures, ports inlets or ports of the microvalve assembly into a cell. From a manufacturing viewpoint in the embodiment of the belleville disc, two halves of the assembly with microactuators can be formed which are virtually identical except for their porting or inletting, and with only one belleville disc needed. An additional aperture is needed after the first microactuator has been activated to allow fluid to pass from the exterior of assembly of the microactuator to the interior chamber adjacent to the aperture now not occluded as a result of the operation, through which aperture fluid can pass to the interior of the cell.

These and other features, advantages and objects of the present invention will be further understood and appreciated by those skilled in the art by reference to the following specification, claims and appended drawings.

Unless otherwise specified, as used herein, the following terms are defined as follows:

fluid—a substance that can flow such as a liquid or a gas;

fluid consuming electrode—an electrode that uses a fluid from outside the cell housing as an active material; and thermally actuated microactuator—a microactuator whose motion is caused by a change in temperature in a portion of the microactuator, and the type of microactuator normally contemplated in this invention.

the terms belleville spring disk, flat spring, or flip spring strip, may also be referred to as belleville spring aperture cover, flat spring aperture cover, or flip spring strip aperture cover as the addition of the words "aperture cover" reflects the function alternately being performed by those elements of occluding an aperture, port or inlet. A belleville spring aperture cover is a form of spring-like shape-retaining valve and a form of spring-like shape-retaining aperture cover.

inlet can be used with respect to fluid flowing into or out of the inlet according to the disposition of a microvalve assembly in a cell, or the disposition of the inlet in the microvalve assembly. "Fluid inlet," "fluid inlet aperture," "inlet aperture" and "inlet" can be used interchangeably.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In one embodiment of the invention, an improved fluid regulating microvalve assembly is operatively connected to a cell that uses a fluid, such as oxygen or other gas or gases, from an exterior of the cell, such as the surrounding atmosphere, as an active material for an electrode present in the interior of the cell. The one or more fluid regulating microvalve assemblies control the flow rate of fluid between the exterior and interior of the cell and ultimately the flow rate to a fluid consuming electrode, such as an oxygen reduction electrode. The cell can be a fuel cell such as a methanol or hydrogen fueled oxygen cell, an air-depolarized cell, or an air-assisted cell as known in the art. Other possible cell types include, but are not limited to, chlorine or bromine depolarized cells. Also, the microvalve assemblies of the present invention can be used in "reserve" cells where the fluid admitted into a predetermined area of the cell by the microvalve assembly is stored in a separate reservoir until required. The fluid can be a salt containing electrolyte or solvent which will dissolve salts in the body of the cell which in combination with the salts form the electrolyte necessary for the cell operation. Similarly, cells designed to operate under water, including saltwater or seawater, can incorporate a microvalve of the present invention allowing the cell to be relatively light in weight until placed in the water whereby the microvalve assemblies selectively admit the water into the cell to be used therein.

The one or more fluid regulating microvalve assemblies are configured to selectively supply the fluid in sufficient amounts from the exterior of the cell so that the cell can discharge at a high rate or power level, and also minimize or prevent the fluid from entering the interior of the cell when the cell is not being discharged or being discharged at an extremely low rate. By increasing the sophistication of the electrical control chips the number of microvalve assemblies open at any given time can be adjusted to match the current demand of the application thereby enhancing the performance of the cell.

The fluid regulating microvalve assemblies of the invention are described herein (below) with respect to air-depolarized cells, preferably utilizing an oxygen reduction electrode, but it is to be understood that the microvalve assemblies can also be utilized with other types of fluid consuming electrodes, such as fuel cells that can utilize one or more fluids other than oxygen, or from outside the cell housing as active materials for one or all of the electrodes of the cell or as performance and safety enhancing devices in rechargeable cells of the aforesaid types. The fluid regulating microvalve assemblies can be utilized with fluids such as seawater, particularly for an underwater application. Examples of seawater batteries are described in U.S. Pat. No. 3,007,993 and in U.S. Pat. No. 3,943,004.

Figure 1:
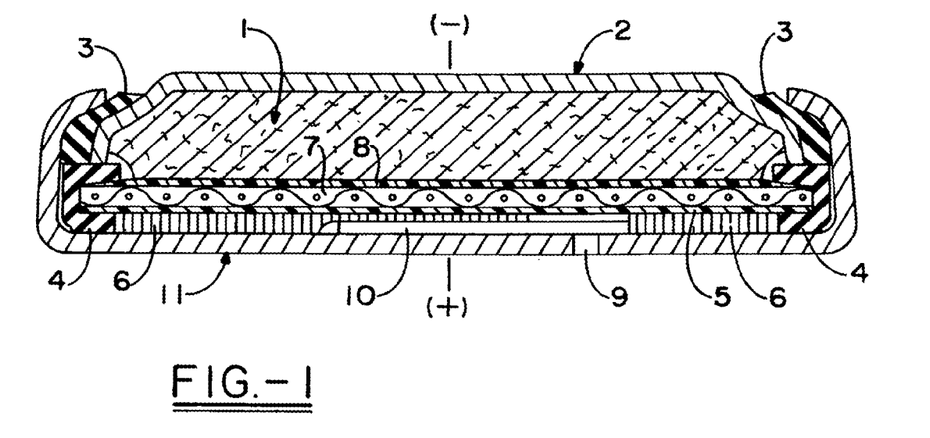
FIG. 1 is a cross sectional side view of a cell including a fluid regulating microvalve assembly.

One embodiment of an air-depolarized electrochemical cell including a fluid regulating microvalve assembly is a button cell, as shown in FIG. 1. The cell includes a housing with a container 11 and a cover 2 and has one or more fluid inlet apertures 9 which preferably are the only fluid communication port(s) between the interior and the exterior of the cell housing. At least one fluid regulating microvalve assembly 10 is operatively connected to the one or more apertures 9 such that, when microvalve assembly 10 is in a closed position, fluid communication from the ambient atmosphere to an oxygen reduction positive electrode located in the interior of the cell is prevented. Likewise, when microvalve assembly 10 is in an open position, fluid communication from the exterior to the oxygen reduction positive electrode in the cell is permitted. The cover 2 is a made from an electrically conductive metal. The metal can include a steel or stainless steel substrate. The exterior surface can have a layer including a metal, such as nickel or tin, that is resistant to corrosion, and the interior surface can have a layer including one or more metals, such as copper, tin, zinc and alloys thereof, with a relatively high hydrogen over potential, to minimize hydrogen gas generation. The substrate metal can be plated and/or clad on one or both surfaces. For example, the cover 2 can be formed from a triclad material with a stainless steel substrate, a nickel layer on the external surface, and a copper layer on the internal surface, and the formed cup can optionally be plated or otherwise coated after forming with another metal, such as tin. The container 11 can be made from an electrically conductive metal such as steel or stainless steel, which may be plated with tin on one or both surfaces.

The housing also includes a gasket 3 between the adjacent side walls of the cover 2 and container 11 to provide a compression seal therebetween and to electrically insulate the cover 2 from the container 11. The gasket 3 can be made from any suitable thermoplastic material that provides the desired sealing properties. Material selection is based in part on the electrolyte composition. Suitable materials for alkaline zinc-air cells include nylons, propylenes, sulfonated polyethylenes, and impact modified polystyrenes.

The cell contains a negative electrode 1 that is adjacent to and in electrical contact with the cover 2, which can be the negative terminal of the cell. The negative electrode includes an active material mixture comprising an electrochemically active material, such as zinc, and an electrolyte, preferably an aqueous electrolyte with a solute such as KOH. The zinc is preferably a low gassing zinc alloy, as described in U.S. Pat. No. 6,602,629, incorporated herein by reference, particularly when the cell contains no added mercury. Alternatively the zinc can be a low expansion zinc, as disclosed in U.S. Pat. No. 5,464,709, incorporated herein by reference, such as an alloy of zinc alloyed with bismuth, indium and aluminum, as disclosed in U.S. Patent Publication No. 2005/0106461-A1, incorporated herein by reference. The negative electrode mixture can be a gelled mixture, using an acrylic acid polymer in the 100% acid form (e.g., CARBOPOL® 940 or 934, available from Noveon, Inc., Cleveland, Ohio, USA) as a gelling agent. The mixture can also include various organic and inorganic compounds as additives, such as additives that can reduce hydrogen gas generation in the cell. Examples of such additives include zinc oxide, indium hydroxide, and a polyethylene glycol compound (e.g., a methoxyethylene glycol such as CARBOWAX® 550, available from Dow Chemical, Midland, Mich., USA).

The cell also contains an oxygen reduction positive electrode 7, which can also be referred to as an air electrode. In one embodiment as shown in FIG. 1, the positive electrode 7 is isolated from the container 11 such that electrical output is passed through the microvalve assembly 10 connected in series to the positive electrode 7. In another embodiment, the positive electrode 7 is in electrical contact with the container 11, which can be the positive terminal of the cell. The positive electrode 7 is a porous layer containing a reversibly reducible material that promotes the reaction of oxygen from outside the cell with the electrolyte so the zinc in the negative electrode 1 can be oxidized. In addition, the porous layer of the positive electrode 7 can also contain carbon or graphite and a binder such as polytetrafluoroethylene. Positive electrode 7 can further include an electrically conductive metal (e.g., nickel) screen or mesh current collector located in the portion of the positive electrode 7 adjacent to the negative electrode 1. The positive electrode can also include a gas (e.g., oxygen) permeable, electrolyte impermeable membrane 5 on the surface of the porous layer facing the apertures 9. The membrane 5 can be a polymeric film, such as a polytetrafluoroethylene film.

At least one, preferably two layers of separator 8 are disposed between the negative electrode 1 and the positive electrode 7. The separator 8 is a thin microporous membrane that is ion-permeable and electrically nonconductive. It is capable of holding at least some electrolyte within the pores of the separator 8. The separator 8 is disposed between adjacent surfaces of the electrodes 1, 7 to electrically insulate them from each other. The separator layers can be the same or different materials. Suitable materials include polypropylene separators. For example, if two layers are used, the layer immediately adjacent to the positive electrode 7 can be a hydrophobic or weakly hydrophilic polypropylene membrane, and the other layer can be a water-wettable nonwoven polypropylene.

Located on the side of the positive electrode 7 opposite the separator 8 can be a porous gas diffusion pad, to allow distribution of air entering the cell across the surface of the positive electrode 7 most distant from the negative electrode. This pad can be made from any suitable material, such as a sheet of polytetrafluoroethylene film. Alternatively the diffusion pad could be supplanted by a set of microvalves suitably distributed.

Below the gas diffusion pad or layer, between it and the inside surface of the bottom of the container 11, can be a spacer 6 with one or more cavities therein to accommodate the one or more microvalve assemblies 10. The spacer 6 cooperates with the container 11 and microvalve assemblies 10 so the only path for gas communication between the exterior and interior of the cell is through apertures 9 and microvalve assembly(lies) 10.

A second gasket 4 can be disposed on the inside of container 11 to electrically isolate positive electrode 7, if desired, such that electrical output is passed through microvalve assembly 10 as shown in FIG. 1. In other embodiments, microvalve assembly 10 is controlled utilizing a control circuit ("control circuit" also referred to as "control circuitry"), and gasket 4 is absent or otherwise situated such that positive electrode 7 is in electrical contact with container 11. Materials suitable for gasket 4 include those types of materials listed above as suitable for gasket 3.

Figure 2:
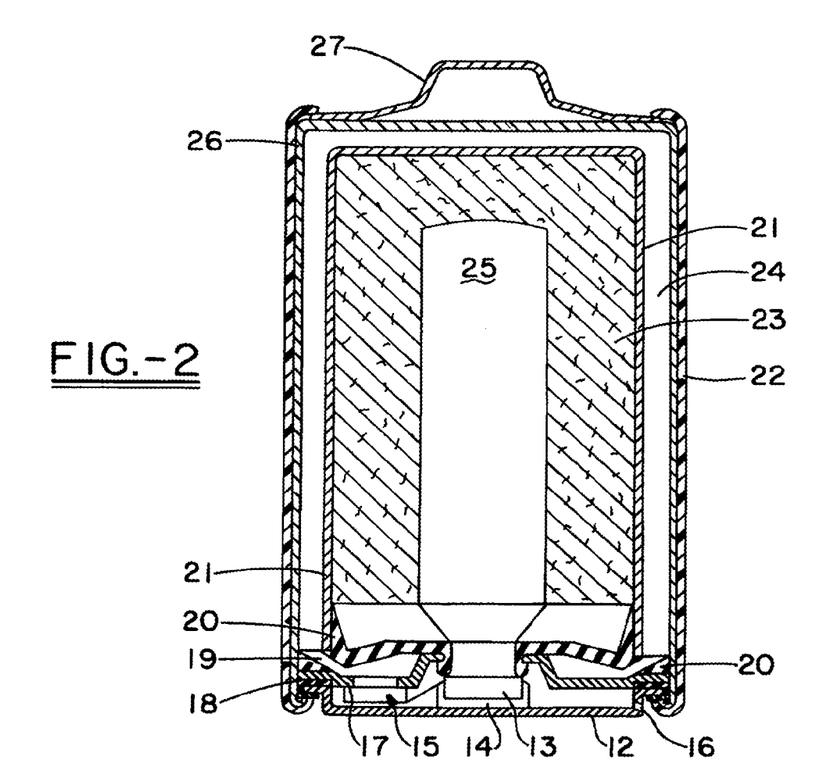
FIG. 2 is a cross sectional side view of a second cell including a fluid regulating microvalve assembly.

FIG. 2 illustrates a further embodiment of the present invention, wherein fluid regulating microvalve assembly 15 is disposed in a cylindrical cell housing. While a cylindrical cell is shown, it is understood by one of ordinary skill in the art that other shapes and/or sizes of cells can be utilized. For example, the cell can be a prismatic cell, having a housing with a generally rectangular or square shape. The cell in FIG. 2 has a housing that includes a can 26 with a closed bottom and a top end, as well as a cell cover 12 and a gasket 18 disposed in the top end of the can 26. The can 26 is in electrical contact with a positive electrode 24, located within an annular chamber, and the cover 12 is in electrical contact with the negative electrode mixture 23 through the microvalve assembly 15 as shown in FIG. 2. That electrical contact can be in series through the microvalve assembly, or the microvalve assembly can be in parallel with the cell. The negative electrode 23 is located in a cavity within the annular positive electrode chamber. A separator 21 is located between positive electrode 24 and negative electrode 23.

The top end of the can 26 cooperates with the cell cover 12 and gasket 18, as well as a sealing member 20, a structural bracing member 17 and a contact member 13 to close the top of the cell, except for one or more passageways for fluid from outside the cell to reach the positive electrode chamber to be controlled by the microvalve assembly 15. The fluid passageway includes at least one fluid inlet aperture 16 in the cell cover 12 and at least one opening in the bracing member 17, and the sealing member 20 is either porous or contains at least one hole 19. At least one microvalve assembly 15 is in control of fluid communication with the passageway(s) to selectively control fluid flow to the positive electrode 24, closing the fluid passageway(s) when the microvalve assembly 15 is in the closed position. When the microvalve assembly 15 is closed, the active ingredients of the cell are effectively sealed from the ambient atmosphere, and when the microvalve assembly is open, fluid communication from the ambient atmosphere to the desired active portions of the cell is permitted. In one embodiment, the microvalve assembly 15 is electrically connected to the negative electrode 23 and positive electrode 24 of the cell, through a control circuit.

The can 26 has a bead or reduced diameter step near the top end to support gasket 18 and cell cover 12. Gasket 18 is compressed between can 26 and cover 12 to form a seal, and a compression seal is also formed between the sealing member 20 and both the can 26 and the contact member 13. The gasket 18 also electrically insulates the negative cell cover 12 from the positive can 26.

The negative electrode 23 includes a current collector 25, which is in electrical contact with contact member 13, and contact member 13 is in electrical contact with cell cover 12, either directly or in series through microvalve assembly 15. Bracing member 17 holds contact member 13 in a centered position, and when electrical contact between the contact member 13 and the cell cover 12 is through the microvalve assembly 15, insulating cap 14 provides electrical insulation between the contact member 13 and cell cover 12.

In one embodiment, the negative electrode 23 includes zinc as an electrochemically active material and an electrolyte.

Positive electrode 24 preferably is porous and electrically conductive and includes a catalyst, such as manganese dioxide, and optionally a binder.

A decorative label 22 surrounds the outside of the can 26 except on the end where the positive terminal cover 27 covers the end of the can 26. The positive terminal cover could also have one or more microvalve assemblies included in the space between the cover and the bottom of the can containing the positive electrode.

In general, components of the cell shown in FIG. 2 can be made from materials of similar compositions to the corresponding components of the button cell described above.

It is to be understood that additional cell parts, arrangements, or the like may also be employed without departing from the teachings of the present invention. For example, the locations of the positive and negative electrodes can be reversed; this requires corresponding relocation of the air inlets and microvalve assemblies. Moreover, two or more cells in one or more housings may utilize the same microvalve assembly or more than one microvalve assembly can be connected to a single cell. The microvalve assembly can be located outside or within the cell housing. The fluid regulating microvalve assembly can be designed to be operated prior to integration into the electrochemical cell, or otherwise be designed to begin functioning after incorporation into the cell. In one embodiment, the cell is provided with a seal over a fluid inlet aperture. In another embodiment the seal is removed manually. In a further embodiment, the microvalve assembly is provided with a seal thereon, that is broken, perforated or split on initial activation of the electrical device.

As described above, in an air-depolarized cell the improved fluid regulating microvalve assembly is operatively connected to the surface of the oxygen reduction electrode that is accessible to fluid (air) from outside of the cell, i.e., the air side, and thus is able to control fluid access to the oxygen reduction electrode. The one or more fluid regulating microvalve assemblies can be disposed in any suitable location in relation to the cell housing, i.e., operatively connected to, on, or within, as long as the assembly is on the air side of the oxygen reduction electrode. For example, a fluid regulating microvalve assembly can be connected to or positioned adjacent to the inside surface of that portion of the housing in which one or more fluid inlets or in particular, air entry ports, are located, or connected to or adjacent to the oxygen reduction electrode, connected to another cell component such as an internal seal member, bracing member or gas permeable sheet, on the air side of the oxygen reduction electrode, or integrated into the case of a battery or of a jacket containing the cell(s).

A printing device is utilized in one embodiment to form one or more layers or components of the fluid regulating microvalve assembly. While the terms "printing" and "depositing" are utilized throughout the specification to describe the microvalve assembly and methods of the present invention, it is to be understood in the broadest aspect of the invention that at least one layer of the microvalve assembly is printed on one or more other layers. The one or more other layers of the microvalve assembly can be printed or formed using one or more different processes, and combinations thereof. The printing device can produce one or more layers in numerous configurations at a relatively high speed on a substrate. Thus, fluid regulating microvalve assemblies of various shapes and sizes can be mass produced in high volume. The substrate can form a portion of the microvalve assembly, such as a microvalve body, or be removed from the printed layers of the microvalve assembly once the printing operation has been performed. In the latter case, the printed layers can form the microvalve assembly alone, or be used in conjunction with one or more other components or layers, for example a spring-like shape-retaining valve that functions as an interior aperture or inlet cover such as a belleville spring disk, flat spring, or flip spring strip, all of which are situated to function to alternately occlude and permit fluid to pass through the microvalve assembly into the cell. Any suitable printing process can be used. Examples of printing processes include indirect (offset) processes, in which ink is applied to a printing plate to form an image to be printed, transferred to a rubber "blanket", and then transferred to the substrate, and direct processes, in which an image is transferred directly from an image carrier to the substrate. Lithography is an example of an offset process, and examples of direct processes include gravure, flexography, screen printing, letterpress printing, and photolithography. Printing processes such as ink jet and laser jet processes can be adapted to making a microvalve assembly. Preferred printing processes include ink jet printing and laser jet printing. Commercially available printing devices and services can be used. Contract manufacturing and design services can be obtained from companies such as First Index of Spokane, Wash. and Whippany, N.J. as well as from Conductive Technologies, Inc. of York, Pa. and Connection Technologies of Detroit Mich. Ink jet printers or printer services are available from REA Electronik GmbH, Cleveland, Ohio, and Muehtal, Germany as well as from Aesthetic Finishers of Piqua, Ohio. Etching services are available from Northwest Etch Technology of Tacoma, Wash., and Fotofabrication of Chicago, Ill. Laser cutting and other services are available from Magni-fab Division of Wooster, Ohio, Schoonover Industries of Ashland, Ohio and Marian, Inc. of Indianapolis, Ind. Miniature spring or spring-like devices are available from Moyer Spring Co., Angola, Ind., or Maverick Spring Makers Limited of Brantford, Ontario, Canada. Belleville discs or belleville washers are available from Fan Disc Corporation of Sun Valley, Calif. and flat click springs can be obtained from Pacific Coast Distributing, Inc. Phoenix, Ariz. One can make a belleville valve by printing a layer of metal or plastic and creating differential material density or thickness in a layer and securing the layer by another layer to create spring-like compression in a layer so that upon movement of the layer, the layer snaps or pops reversibly from one shape-retaining form to another shape-retaining form.

In addition to the printing device, additional devices and processes can be utilized in combination to produce the microvalve assembly. For example, devices can be utilized to create apertures or vents in one or more layers of the microvalve assembly; to remove a portion of a layer or coating of the microvalve assembly such as by a process, but not limited to, cutting, melting, washing, dissolving, or the like; and to join portions of the microvalve assembly. Accordingly, additional devices that can be used to prepare a microvalve assembly, individually or in combination, include, but are not limited to, die cutting devices, drilling devices, chemical and photochemical etching processes, and devices such as lasers, laminating devices, machining or micromachining devices, or the like. Devices and processes can be utilized that wash away or melt out a portion of one or more (a) temporary layers such as a filler plug, or (b) permanent layers of the microvalve assembly to create a desired form such as, but not limited to, a cavity or fluid transport channel, aperture, port, or inlet, or a free space to allow movement of one or more parts. One or more layers can be printed which do not adhere to parts of the substrate or subsequent layers so they function as parting layers allowing movement of adjacent parts. Examples of various materials and techniques are set forth in U.S. Patent Application No. 2003/0201175, U.S. Pat. No. 5,246,730, and U.S. Pat. No. 4,830,922, herein fully incorporated by reference.

Fluid regulating microvalve assemblies generally comprise a stationary microvalve body having one or more fluid apertures and a microactuator, which is movable from a closed position to an open position, thereby allowing fluid to flow through the microvalve body one or more apertures. In one embodiment, construction of a fluid regulating microvalve assembly is accomplished using a printing process to build layers of the microvalve assembly on a substrate. Many different types of substrates can be utilized, including, but not limited to, metals, metal oxides, glass, polymers, rubbers or elastomers, and combinations thereof.

Non-limiting examples of metals and metal oxide substrates comprise silica, silicon, aluminum, iron, nickel, tin, zinc, copper, titanium and combinations and alloys thereof, such as brasses, bronzes, stainless steels and shape memory alloys.

Non-limiting examples of polymers comprise polyester, polycarbonate, polystyrene, polyolefins such as polyethylene or polypropylene, polyethylene terephthalate, polyamide, polyoxides such as polyethylene oxide, polyacrylamide, polyurethane, polyalkene, polyacrylate, polymethacrylate, polyvinyl ether, polyvinyl thioether, polyvinyl alcohol, polyvinyl ketone, halogenated polymers such as polytetrafluoroethylene (TEFLON® from DuPont) or polyvinyl halides such as polyvinyl chloride, polyvinyl nitrite, polyvinyl ester, polyarylene, polysulfonate, polysiloxane, polysulfide, polythioester, polysulfone, polyacetal, or copolymers or combinations thereof.

Non-limiting examples of substrate rubbers or elastomers comprise or are derived from one or more same or different conjugated dienes having from 4 to about 12 carbon atoms with specific examples including butadiene, isoprene, pentadiene, hexadiene, octadiene, and the like. Rubbers of the substrate include copolymers of the above-noted conjugated diene monomers with one or more vinyl substituted aromatic monomers containing from 8 to 12 carbon atoms such as styrene, alpha-methyl styrene, t-butyl styrene, or a vinyl compound such as acrylonitrile, vinylpyridine, acrylic acid, methacrylic acid, alkyl acrylate, and alkyl methacrylate. Still further rubbers include copolymers of olefins with a non-conjugated diene (EPDM rubbers) such as ethylene propylene cyclopentadiene terpolymers, ethylene-propylene-5-ethylidene-2-norbornene terpolymers, and ethylene propylene 1,4-hexadiene terpolymers. Further examples of suitable rubbers include polybutadiene, synthetic polyisoprene, natural rubber, styrene-butadiene rubber, EPDM rubber, nitrile rubber, halogenated rubber, neoprene, silicone elastomers, ethylene acrylic elastomers, ethylene vinyl acetate copolymers, epichlorohydrin elastomers, and the like, or combinations thereof.

The polymers, rubbers, or elastomers, and combinations thereof, whether utilized in the substrate layer, or in one or more other layers of the present invention, independently, can include one or more of various additives, fillers, lubricants, stabilizers, processing aids, antidegradents, waxes, fibers that are synthetic or natural or both, mineral fibers, glass, clay, silica, compatibilizers, flame retardants, dispersing agents, colorants, and the like, which are utilized in conventional amounts as known to the art and to the literature. Examples of natural fibers include, but are not limited to, cotton and cellulose fibers. Examples of synthetic fibers include, but are not limited to, fiberglass, polyester, polyamide both nylon and aramid, polyethylene, polypropylene, and carbon fibers.

The substrate is rigid or flexible in character. In a preferred embodiment, the substrate is a rigid sheet or film. In a preferred embodiment, the substrate has a thickness of generally from about 0.01 to about 0.375 millimeters, and preferably from about 0.05 to about 0.25 millimeters. In one embodiment, the substrate forms at least a portion of the microvalve body of the fluid regulating microvalve assembly and remains in a stationary position when the microvalve assembly microactuator is actuated moving a sealing member between a closed position and an open position. The substrate may be porous or non-porous to fluids, with non-porous substrates being preferred to more accurately control the amount of fluid that passes through the fluid regulating microvalve assembly.

Figure 3A:
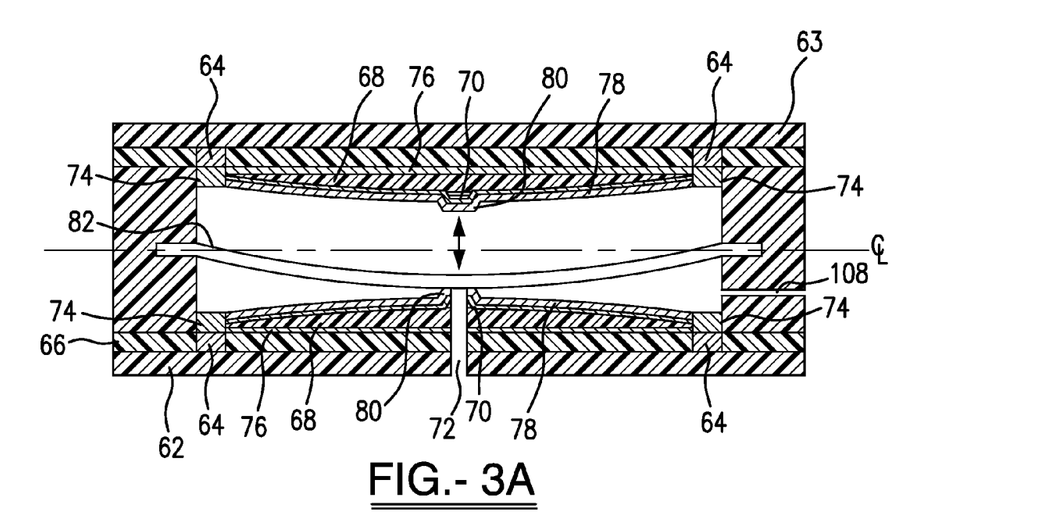
FIG. 3A is a cross sectional side view of an embodiment of a fluid regulating microvalve assembly incorporating one alternative of a belleville disc wherein the microvalve assembly is in first closed position.

A fluid regulating microvalve assembly consisting of two halves joined together after microactuator construction is fabricated in one embodiment as follows. One embodiment of the particular microvalve assembly is illustrated in FIG. 3A. The microvalve assembly contains two microactuators cooperating together and a belleville spring disk, flat spring, or flip spring strip, all of which are situated to function to alternately occlude and permit fluid to pass into the cell, sealed in the assembly. Desired substrates 62,63 are provided, preferably having a thickness sufficient to bear the contemplated fluid pressure. The substrate 62 is perforated or cut to produce an aperture 72 through which fluid will flow. When the substrates 62,63 utilized are of a larger area than the desired area for the microvalve assembly, the substrate may be perforated or cut to the size of the desired microvalve assembly to be produced. The length, width and height dimensions of the microvalve assembly are limited by the dimensions and desired placement in a cell, battery, or case design. Independently, the length and width generally range from about 2 to about 25 millimeters, and preferably from about 5 to about 10 millimeters. The size of one aperture 72 ranges generally from about 0.1 to 10 millimeters, and preferably from about 0.4 to about 2 millimeters. In one embodiment, a preferred microvalve assembly is 5 millimeters in length by 5 millimeters in width having a 1.25 plus or minus 0.25 millimeter diameter aperture. It is contemplated that numerous fluid regulating microvalve assemblies can be prepared on a single substrate being formed in rows and columns with appropriate spacing between each microvalve assembly. The microvalve assemblies can be mass produced and separated for incorporating one or more into a cell or housing.

In addition, however, the microvalve assembly, particularly using the belleville spring, can be miniaturized to a nanotechnology level, limited only by the power carrying capacity of the conductive layers, the thinness of deposition possible to accomplish the functions of the various layers, the desired fluid flow, and then selecting a material for the belleville spring or flat spring of suitable flexibility and shape retention characteristic to achieve the performance characteristics described in this invention enabled to a microscopic or nanoscopic level. That material can be a plastic or polymer material as no conductive characteristic is needed.

One or more layers are then deposited upon the substrates 62,63 in desired areas thereof. Such layers can be part of the microvalve body or microactuator and can be conductive or non-conductive as desired. A first layer is deposited onto the substrates 62,63. The first layer deposited onto the substrates 62,63 can be a conductive layer 64, deposited in two lines, each of which form an electrical lead, so that one end of each lead is adjacent to an edge of the microactuator assembly. In a preferred embodiment, the conductive layer 64 is formed of two electrical lead lines which extend in a direction parallel to the length or width of substrates 62,63.

An insulating layer 66 is then printed onto the actuators, over at least a portion of the conductive layer 64. The insulating layer 66 generally comprises a dielectric coating sheet or film, or the like, which is electrically non-conductive and will not decompose, become conductive or unintentionally adhere to a subsequent layer when exposed to heating of the later applied resistive layer, as described below. Such insulating coatings are known to those skilled in the art and include, but are not limited to, urethanes, acrylates, polysulfones, polysiloxanes, halogenated polymers, and polyesters, or combinations thereof. In one embodiment, one or more insulating layers 66 deposited on the substrate 62 or another layer, or combinations thereof, can be formed from non-conductive or dielectric polymers, rubbers, or elastomers as described for the substrate 62 hereinabove. In FIG. 3A, three insulating sublayers are shown, but any appropriate number of layers can be used to create the desired form. If more than one insulating layer is used, each layer can be the same or a different material. In some embodiments, insulating layer 66 is chosen to provide effective parting layer characteristics.

Figure 3B:
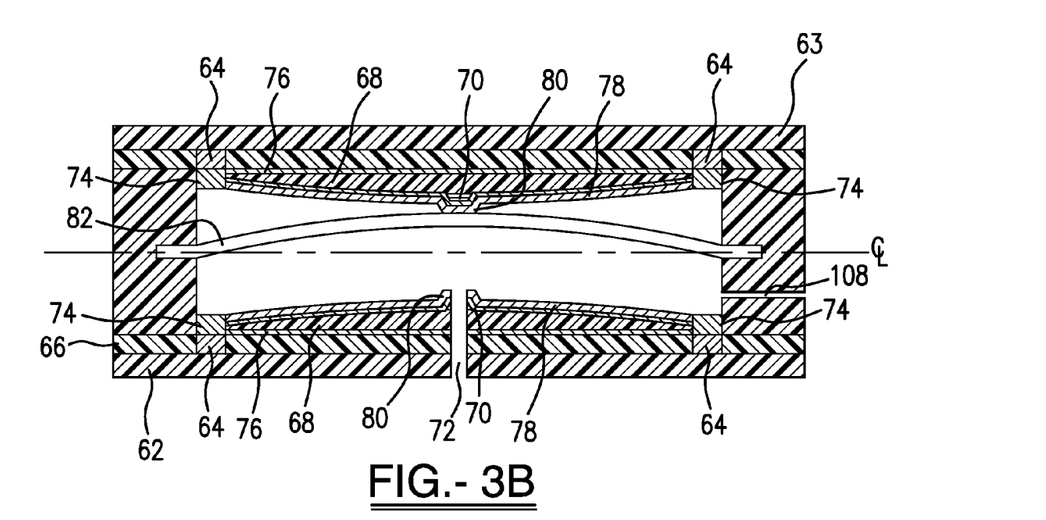
FIG. 3B is the cross sectional side view of FIG. 3A, wherein the microvalve assembly is in a second, open position with the spring-like shape-retaining valve that functions as an interior aperture or inlet cover, here a belleville disc, or flip spring strip that retains its shape after movement popped away from sealing the fluid inlet enabling entrance of fluid, particularly air, into the cell.

In a preferred embodiment as shown in FIG. 3A, the insulating layer 66 covers substantially all of the substrates 62,63 of the microactuator assemblies and the conductive layer 64 except for one or more areas near one or more ends or edges of the substrate 62. Printing of one or more insulating layers, such as 66, 68, and 70 as illustrated in FIGS. 3A and 3B, can be accomplished in one or more passes in order to build up the insulating layers 66, 68, 70 on the substrates 62,63 such as in the area where the aperture will be or any other desired area. In a preferred embodiment as illustrated in FIG. 3A, microvalve body insulating layer 66 has a parting layer 76 printed on it so layer 68 can move away from layer 66 when the microactuator moves to the open position. Then insulating layer 68 is printed on a portion thereof of layers 66 and 76, generally between the lead lines of conductive layer 64. The upper surface of insulating layer 68 is curved in order to cause resistive layer 78 to expand away from insulating layer 66 during heating and expansion of the resistive layer 78. The microvalve body can include an additional insulating layer formed as a boss or simply have a boss 80 shaped on layer 78. Boss 80 is generally a raised rim surrounding aperture 72 that serves to provide a gasket having desired sealing characteristics. A laser or chemical etching process then is utilized to remove the portions of the insulating layer above the conductive lines of the first layer or any insulating layer material above aperture 72 in substrate 62, and combinations thereof.

Afterwards, conductive material, which can be of the same type or a different type than utilized in the first layer, is deposited in the areas removed by the laser to provide rigid electrical contacts 74 protruding up through the insulating layer. The composition of the conductive material of protruding electrical contact 74 is not critical, but preferably the material is of appropriate resistivity, is rigid, has adequate cohesive strength, and is readily adhered to by the resistive layers 78 described below. It is important, however, that the conductive material, if a liquid, be able to dry upon being printed or coated on the substrate or other layer, leaving a conductive coating thereon. Examples of conductive materials include, but are not limited to, metals and solvated polymer solutions containing conductive particles such as aluminum, carbon, silver, gold, copper, platinum, or combinations thereof. The conductive solids content of the solvated polymer generally ranges from about 40 to about 90 percent by weight, based on the total weight of the solvent, polymer, and conductive solids in the mixture. The amount of conductive particles required to be present in the mixture to provide the desired electrical conductivity may vary depending on the identity of the conductive particle due to differences among the particles with respect to density, conductivity, etc. The same or different coatings may be utilized in the same or different layers of the microvalve assembly. The conductive material may be comprised of a variety of film forming polymers which are compatible with the conductive particles and mixed therewith and which will adhere to the substrate or other layer upon drying or removal of the solvent. Examples of film forming polymers which may be utilized to form a conductive material include, but are not limited to, polymers such as polyesters and polyacrylates. One of ordinary skill in the art can readily ascertain the identity of acceptable polymers for use in the conductive material layer(s). Alternatively, direct metal deposition by electrochemical or vapor deposition means could be employed alone, or in combination with the above polymer matrix films to form either conductive layer 64 or conductive protruding electrical contact 74, and combinations thereof.

An aperture or apertures 72 are left uncoated or created after forming the one or more insulating layers 66, 68, 76 and boss 80 immediately above and matching the aperture or apertures 72 in the substrate 62, to extend through both the substrate and the insulating layers. A plug of material is then placed in each aperture 72 which can be washed or melted out after the next layer or layers have been deposited. Examples of suitable materials include waxes and low molecular weight polymers that can be at least partially removed. The plug is utilized to prevent subsequent material applied to the microvalve assembly from obstructing or partially obstructing aperture 72. The resistive material layer 78 is deposited upon a predetermined portion of an upper surface of the microactuator assembly, generally on the parting layer 76. The resistive material layer 78 is conductive and has a coefficient of thermal expansion (CTE) greater than that of preferably all of the layers 66, 68, 76 and boss 80. The resistive material layer 78 in the microactuator containing the aperture or apertures is deposited at least in an area which makes electrical contact with the two electrical contacts 74 protruding upward through the insulating layer 66 and also covers the aperture 72 in the layers 66, 68,76 and 70. A segment of a circuit is formed running from the first lead through the resistive material layer 78 to the second lead. The resistive material layer 78 is secured to the microvalve assembly in at least one line or location. The plug of material is removed from aperture 72 after the resistive material layer 78 is formed. Upon the application of a potential to the resistive material layer 78 through the electrical leads 74 or contacts 64 of the conductive layers, the resistive material layer 78 heats and distorts away carrying with it the layers 68, 76 and boss 80, creating a passage through these layers, resistive material layer 78 and layers 68, 76 and boss 80 thereon and the fluid inlet aperture or apertures 72 in the insulating layer and substrate. Fluid can then pass the aperture or apertures. The substrate 62 and insulating layer 66 of the microactuator body remain stationary while the microactuator layers 68,76 and resistive layer 78 move from a first position to a second position, thereby causing the spring-like shape-retaining interior valve, which functions as an aperture cover, such as a belleville spring disc 82 or a flat spring which is a deformable flat strip of the microvalve assembly (not shown, but to be anchored on one edge by 74 as in FIG. 4A) to snap to a second position thereby permitting fluid flow through the microvalve assembly. Examples of resistive materials for resistive layers 78 include, but are not limited to, materials described for the conductive layers 64 and 74 hereinabove, and preferably are high thermal expansion conductive polymer matrix materials including conductive particles, and high thermal expansion metals such as aluminum, certain brasses, bronzes and magnesium.

The above described fluid regulating microactuator assembly is optionally detached from the substrate 62 and assembled into a cell as desired to control flow of fluid. That said, if the substrate 62 is removed, insulating layer 66 is generally considered the base of the microvalve body of the microvalve assembly.

Figure 5:
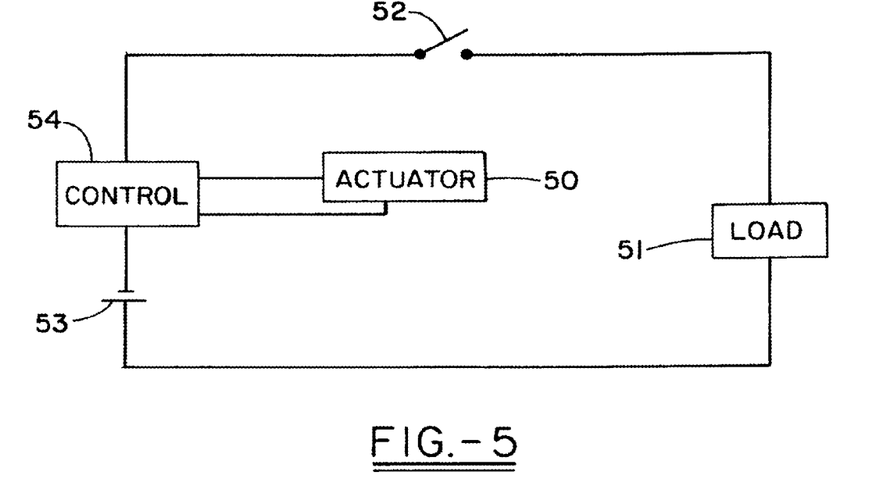
FIG. 5 is a schematic of one embodiment of a circuit plan including a battery, control unit, microactuators and switch.

In this embodiment the fluid regulating microvalve assembly includes a belleville disc. FIGS. 3A and 3B show an embodiment of this microvalve assembly with a belleville spring operating to provide a closed position and an open position, respectively. An adhesive may be used to join the halves together as appropriate. A control unit, which can include a microchip or embedded microcircuit, as shown in FIG. 5, can be added. The control unit can be connected electrically through two additional conductive contact lines included in the conductive layer of the microvalve assembly, extending across at least part of the substrate to provide electrical connections to the first (closed) position microactuator. The control unit can be used to provide power to this microactuator only when power is required from the cell or battery for a powered appliance.

In FIG. 3A, belleville disc 82 is shown in a first position when the microvalve assembly is in the closed position. Applying a potential across the resistive layer 78 (adjacent to aperture 72) through conductive layer or strips 64, 74 causes the resistive layer 78 to expand and move upward with insulating layer 68 and parting layer 76, a design determined distance, thereby causing the belleville disc or strip to "pop" away from its first position covering the entry to an aperture to fluid inlet 72 which extends through the parting layer 76, the insulating layer 68, the resistive layer 78, insulating layer 70, and boss 80. The belleville disc, or flat spring strip, is moved, and thereby snaps or "pops" to its second open position where it remains until acted upon. The potential is then removed from the resistive layer 78, allowing it to cool and return to its first position as shown in FIG. 3B leaving a passageway through which fluid can pass through the aperture 72 in the substrate 62 and insulating layers 66, 68, parting layer 76, boss 80, and resistive layer 78 and inlet 108 even though no current is flowing through the resistive layer 78 or the belleville disc. The spring-like, shape-retaining cover, here a belleville disc 82 or flat spring (which flat spring could be a flip spring strip) which is being popped, can contain one or more perforations to allow fluid to flow into the cell. Similarly if necessary one or more inlets 108 can be created opening to allow fluid to pass into the cell and positive electrode. The microvalve is connected to a control unit, and when the control unit senses that power is no longer required from the cell, the control unit allows a potential to be placed across the resistive layer 78 adjacent to the second position of the belleville disc or strip through conductive strips 74 of the second microactuator for a sufficient time for insulating layer 68, resistive layer 78 and parting layer 76 to move against the spring-like shape-retaining aperture cover, here a Belleville disk or flip spring, 82, moving it the designed distance. The belleville disc with spring-like characteristic 82 is popped back to its first position, and the second microactuator is deactivated allowing it to return to its first position. In this manner, parasitic power from the cell is consumed only to move the microvalve assembly from the closed position (FIG. 3A) to the open position (FIG. 3B) and vice versa, and the useful life of the cell is extended.

The microvalve assembly in FIGS. 4A and 4B can be made utilizing a process similar to that described above for the microvalve assembly in FIGS. 3A and 3B, except as follows.

In this alternative method of making a microvalve with a retention mechanism an internal microactuator arm consists of a flat spring which is placed or deposited within a cavity in the microvalve assembly. Opposing microactuators cooperate and are disposed within the microvalve assembly; one method is by depositing layers of the microactuators and using an adhesive to join the halves together. In this embodiment, the fluid regulating microvalve assembly includes a simple flat spring. FIGS. 4A and 4B show an embodiment of this microvalve assembly with a flat spring operating to provide a closed position and an open position, respectively. A control unit, which can include a microchip or imbedded microcircuit, as shown in FIG. 5, can be added. The control unit can be connected electrically through two additional conductive contact lines included in the conductive layer of the microvalve assembly, extending across at least part of the substrate to provide electrical connections to the first microactuator adjacent to the closed position which first microactuator is designed to move the flat spring to the open position and cooperating with the second cooperating microactuator enabling a catch of the flat spring. The two microactuators are sequenced by the control unit so the second microactuator in conjunction with the catch of the flat spring opens followed by energizing the first microactuator which moves the spring from the closed position to the open position. De-energizing the second microactuator cooperating with the catch of the flat spring causes the flat spring to be engaged and prevented from returning to its first position at which time the first microactuator is de-energized allowing it to return its original position leaving the flat spring retained in the microvalve open position. When it is desired to turn the microvalve assembly off the control unit activates only one of the microactuators, that is, the second microactuator, moving the catch of the flat spring, and disengaging it from the flat spring, whereupon the flat spring returns to a first position and closes the microvalve. The control unit can be used to provide power to these microactuators only when power is required from the cell or battery for a powered appliance or when the power is not needed and the microvalve needs to be turned off or the closure of the microvalve can be delayed by the control circuit as described elsewhere in this application. The control circuit or control circuitry can be configured to control one or more microvalve assemblies, or one or more microactuators or set of microactuators within a microvalve assembly.

Figure 4A:
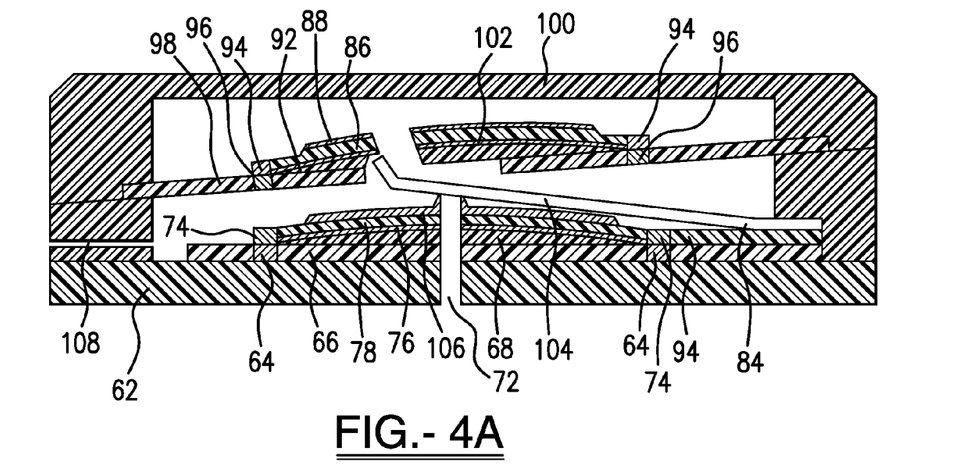
FIG. 4A is a cross sectional side view of an embodiment of a fluid regulating microvalve assembly including two cooperating portions connected, further incorporating a flat spring in the valve closed position.
Figure 4B:
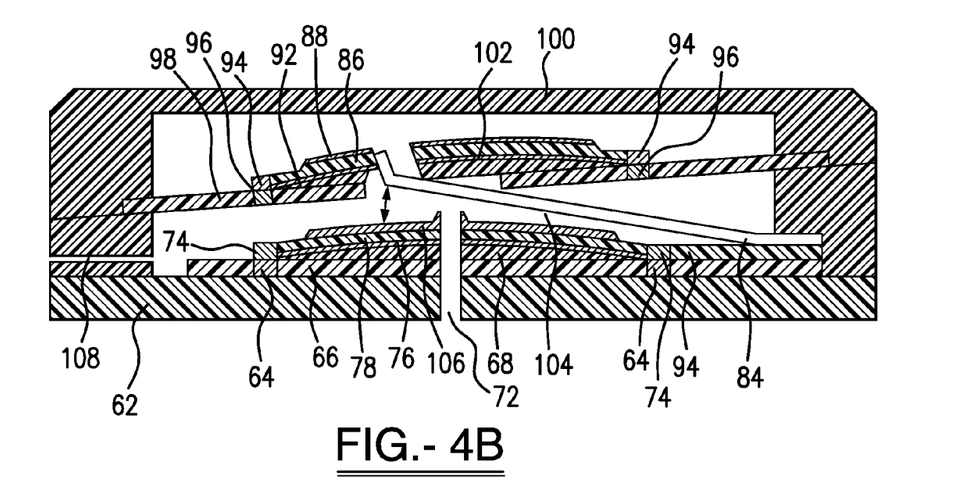
FIG. 4B is the cross sectional side view like FIG. 4A, wherein the microvalve assembly is in an open position with the flat spring caught in a second position not sealing the fluid entrance port.

In FIG. 4A, the flat spring is shown in a first position when the microvalve is in the closed position. The second microactuator is built up upon base 98 and insulating layers 92 and parting layer 102 are coated in or on base 98. Conductive strips 94 and 96 are coated in or on base 98. Applying a potential across the resistive layer 86 through conductive strips 94, 96 causes the resistive layer 86 to expand and move upward with parting layer 102, a design determined distance. Applying a potential to the second microactuator creates an opening into which the spring strip 104 can be pushed by the first microactuator. Simultaneously or after a slight delay a potential is applied across the cooperating first microactuator containing an aperture or apertures. This potential across resistive layer 78 causes it to move (usually designated as upward) carrying with it parting layer 76 and cover layer 106. The first microactuator thus pushes the spring strip 104 up into the cavity now available for its tip in cooperation with the second microactuator. Cutting off the power to the second microactuator by the control unit then allows the first microactuator to assume its initial position trapping the spring strip 104 in the cavity as shown in FIG. 4B. Subsequently cutting off the power to the first microactuator creates the positions as shown in FIG. 4B leaving a passageway or fluid inlet aperture 72 through which fluid can pass through the aperture 72 in the substrate 62 and insulating layers, 66,68, parting layer 76, and resistive layer 78 and insulating layer 106 even though no current is flowing through the resistive layers 78 and 86 or the flat spring. A gasket can be placed on insulating layer 106 to optimize sealing. A boss can be shaped on insulating layer 106 to optimize sealing. The second microactuator assembly can contain one or more perforations to allow fluid to flow into the space between the microactuators or through one or more inlets, inlet apertures, or apertures 108 into the cell. The microvalve assembly is connected to a control unit, and when the control unit senses that power is no longer required from the cell, the control unit allows a potential to be placed across the resistive layer 86 through conductive strips 94, 96 of the second microactuator for a sufficient time for the insulating layer 92, resistive layer 86 and parting layer 102 to move releasing the flat spring 104 to return to its first position. The potential is removed from the second microactuator allowing it to return to its first position. In this manner, parasitic power from the cell is consumed only to move the microvalve from the closed position (FIG. 4A) to the open position (FIG. 4B) and vice versa, and the useful life of the cell is extended. Moreover, since only one of the two microactuators is activated for the closing action less power is consumed to close the microvalve assembly in a period when less power is often available from the associated electrochemical cell or cells.

FIG. 5 is a schematic diagram illustrating one embodiment of a control circuit for microactuator 50 of a microvalve assembly of the present invention. Microactuator 50 is connected to a control unit 54, that can be printed in one embodiment, connected in series with an electrical switch 52. FIG. 5 also illustrates load 51, connected in series with switch 52, control unit 54 and battery 53 or cell including those of FIGS. 1 and 2. Control unit 54 responds to voltage and current characteristics of the circuit it is connected to. Control unit 54 can vary the potential supplied to the microactuator 50 in order to regulate or optimize fluid flow through the microvalve assembly. The control unit can also respond to measurement of potential which can signify the fluid depolarized state of the fluid depolarizing electrode, which in air cells would be a potential reflective of the oxygen state of the cell at the "air electrode."

Figure 6:
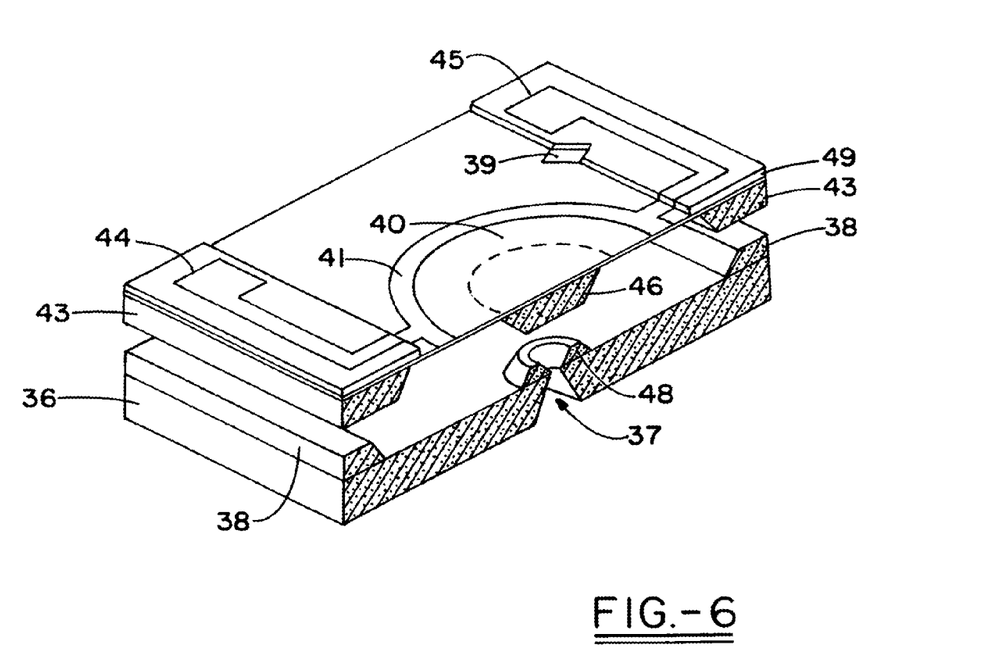
FIG. 6 is a cross sectional side view of an improved embodiment of a fluid regulating microvalve assembly including two portions in position to be connected.

A further embodiment of a fluid regulating microvalve assembly is illustrated in cross section in FIG. 6. The cross-section shows a microvalve assembly in two sections which are in position to be connected, such as through an adhesive or lamination, or the like, to create an assembled microvalve assembly. The microvalve assembly includes a microvalve body comprising substrate 36 which is preferably in the form of a rigid sheet or film, as described hereinabove. Substrate 36 includes aperture 37. End supports 38 are deposited on substrate 36, preferably utilizing a printing process. Boss 48 can be deposited around aperture 37 utilizing the same material as end supports 38. If desired, end supports 38 and boss 48 can be deposited as a continuous layer on the substrate 36 and portions of the material subsequently removed to create the end supports 38 and boss 48. Preferably boss 48 is a different material, selected to provide a good seal with a second boss 46. Alternatively, a coating could be deposited on the surface of at least one of boss 48 and boss 46 to function as a gasket.

The upper portion of the microvalve assembly comprising a microactuator as illustrated in FIG. 6 is formed on a non-conductive membrane sheet 40, at least utilizing the printing process. In one embodiment, the membrane sheet 40 is formed of material as described for the substrate hereinabove, such as polymer matrix semiconductors, glasses, silicon, polymers, rubbers, or elastomers. Selected areas of the membrane sheet 40 are overprinted in one embodiment with a non-conductive layer 49, preferably adjacent to two opposite ends of the membrane sheet 40 at least in the area above end supports 43, with the same or a different material as membrane sheet 40 in order to create a relatively thin section within supports 43, located radially outward from the location of second boss 46. An expansion layer 41, which includes a resistive material, is deposited on membrane sheet 40 preferably by printing. In this embodiment, expansion layer 41 is preferably formed in an annular strip disposed around boss 48, rather than having a planar shape as in the embodiment shown in FIGS. 4A and 4B. Conductive leads make electric contact between each of contact points 44 and 45 and expansion layer 41, such as illustrated. Upon application of a potential to the contact points 44 and 45, expansion layer 41 heats, expands, and causes deformation of membrane sheet 40. Aperture 39 is preferably placed in membrane sheet 40 to admit fluid to the center of the microvalve. A boss 46 is deposited on the underside of membrane sheet 40 in one embodiment and is sufficient in size and located to cover boss 48 in the lower portion of the microvalve assembly. Boss 46 functions as a sealing plug on lower annular boss 48. End supports 43 are deposited along one or more lower edges of the membrane sheet 40. Boss 46 and end supports 43 can be deposited utilizing a printing process. If desired, end supports 43 and boss 46 can be deposited as a continuous layer on the underside of membrane sheet 40 and portions of the material subsequently removed to create the end supports and boss 46.

As stated hereinabove, the upper and lower end supports are connected to form the microvalve assembly. The supports can be connected via lamination or an adhesive such as known in the art. Optionally, a gasket or sealant layer is deposited on boss 48 to optimally seal aperture 37 in conjunction with boss 46. The gasket or sealant layer is preferably formed of an elastomeric compound which will not adhere to the layer, such as boss 46 contacting it during the operation of the microvalve and microactuator. Suitable materials include, but are not limited to, polyethylene terephthalate, polytetrafluoroethylene such as TEFLON® (DuPont), or polymethylsiloxane. In an open position, fluid can flow through the gap in the sides of the microvalve if not sealed by end supports 38 and 43, or through aperture 39 if the microvalve ends are sealed, and ultimately through aperture 37 into the cell or into a battery compartment. If desired different portions of a layer (e.g., end supports 38 and boss 48 on substrate 36, or end supports 43 and boss 46 on membrane sheet 40) can be either the same material, as described above, or they can contain different materials.

In the embodiments, the conceptual framework is that fluid is alternately occluded and permitted to enter from the exterior of the microvalve assembly to a void just above the boss against which the belleville valve, flip spring or flat spring seat to occlude fluid flow through the aperture 72 or 106 into the cell. To further enable such fluid entry, apertures or holes or a framework through the side wall of the microactuator can be used. In the FIGS. 3A and 3B and 4A and 4B show an aperture 108 as one way to accomplish that result.

The fluid regulating microvalve assemblies of the present invention include microactuators that can move in various ways and in combinations of ways from a first position where fluid cannot pass through the microvalve body aperture to at least a second position which allows fluid to pass through the microvalve body aperture. Movements include, but are not limited to, motion towards and away from a portion of the microvalve body particularly an aperture, linear or non-linear movement, movement parallel to a surface such as a microvalve body, and movement which serves to engage or disengage a spring-like shape retaining valve which has a springy-arm characteristic.

In one embodiment the fluid regulating microvalve assembly is electrically connected, preferably in a series circuit, to the cell to which it is controlling fluid access. In a further embodiment, the fluid regulating microvalve assembly is provided with a separate power source other than the cell or cells it is operatively connected to. Electrical connections between the microvalve assembly electrical contacts and the cell electrodes can be accomplished in any suitable manner that provides a reliable connection. For example, one of the microvalve assembly electrodes can be in direct physical and electrical contact with the positive electrode such as the oxygen reduction electrode. Alternatively, one electrical contact can be in direct contact with an electrically conductive portion of the cell housing that is in electrical contact with the positive electrode. Further, if desired, an electrical lead can be used to provide electrical contact with the positive electrode.

It may be desirable to electrically polarize the microvalve assembly as either positive or negative. It is desirable to polarize the microvalve assembly negatively in an acid electrolyte cell and positively in an alkaline electrolyte cell to reduce the likelihood of electrolyte creepage into the microvalve assembly reducing or destroying its ability to operate. The microvalve assembly electrical contact that is electrically connected to the negative electrode of the cell can be connected with an electrical lead. An electrical lead can have a travel path around or through the positive electrode or oxygen-reduction electrode, as long as the lead is electrically insulated therefrom. In one embodiment, the electrical connector connecting the microvalve assembly to the negative electrode of the cell may be in the form of a wire or thin metal strip with dielectric material insulating any parts of the lead that may otherwise come in electrical contact with the positive electrode, either directly or indirectly through another cell component such as a conductive portion of the cell housing, a positive electrode, current collector, or a positive electrode electrical contact, lead or spring. In a further example, the electrical lead to the negative electrode may be in the form of one or more thin layers of metal printed or otherwise deposited on a portion of one or more other cell component, such as surfaces of gasket, insulators, cans, covers, and the like. Layers of the dielectric material may be coated over or beneath, or a combination thereof, the metal layers to provide the necessary insulation from the positive electrode.

The potential applied to the fluid regulating microvalve assembly to operate the microactuator can originate within the cell. For example, the potential applied to the microvalve assembly can be the cell potential, as described above. The cell potential can also be changed. If a higher voltage is needed to produce a desired microvalve assembly microactuator movement, the cell potential can be adjusted upward. Adjusting the cell potential can allow for the use of different types of materials for the microactuator. Increasing the cell potential can be accomplished, for example, with a controlled circuit, to regulate or step up the cell voltage and thus more strongly induce movement of the microactuator to operate the microvalve assembly.

The control circuit can also be utilized to control other cell features or components. For example, the control circuit can be utilized to monitor the need for oxygen and then apply a potential across the microvalve assembly to open or close the microactuator. For example, the control circuit can include an oxygen sensor to monitor the oxygen level in the cell. The control circuit can also be utilized to monitor the cell voltage or monitor the potential of the positive electrode against a separate reference electrode. The control circuit can be connected to an oxygen sensor or fluid sensor (such as in a bromine cell) to determine if the cell needs restoration of its fuel fluid potential state so that there is adequate start-up energy for cell activation when the cell is reactivated. The control circuitry would normally be set so that the predetermined level at which the cell would be deemed to have adequate energy presence would be that level at which the cell can produce the design voltage of the cell on reactivation and microvalve assembly functioning. The control circuit can be printed utilizing the printing process of the present invention or another process. The control circuit can be applied to a cell or battery component or be included on a separate substrate or wafer or chip, or any other suitable arrangement can be utilized.

The control circuit can have components including, but not limited to, fuses, inductors, capacitors, resistors, and transistors. The control circuit can be designed to fail on contact with a corrosive fluid or to shut down upon excessive current demand.

The fluid regulating microvalve assemblies of the present invention can be incorporated into cells in various ways, depending on the type and design of the microvalve assembly and the cell. In one embodiment as described hereinabove, the fluid regulating microvalve assembly is contained within the cell housing. However, it is to be understood, that other embodiments of the invention are contemplated in which the microvalve assembly, control circuit, or combinations thereof, can be disposed outside the cell, such as between the external surface of the cell housing and a battery jacket or case. The minimal volume requirements for the fluid regulating microvalve assembly make such embodiments possible in batteries with little space available between the cell and jacket or case.

As disclosed above, a preferred embodiment of an electrochemical cell using a microvalve assembly according to the invention is an air-depolarized cell. Another preferred embodiment is an air-assisted cell. Yet another preferred embodiment is a fuel cell. A preferred cell shape is a button shape. Another preferred cell shape is a cylindrical shape. Yet another preferred cell shape is a prismatic shape.

An electrochemical cell according to the invention can be part of a battery comprising one or more cells. In one preferred embodiment more than one battery cell can share a single microvalve assembly, and in another preferred embodiment each cell can have one or more separate microvalve assemblies. In other preferred embodiments, microvalve assemblies can be located within or on the battery housing, or they can be mounted on a portion of an appliance in which the battery is installed. The appliance can be designed to have the microvalve assembly disposed so that when a fluid depolarized cell is inserted, exchanged, or otherwise provided, an inlet to such a fluid depolarized cell is adjacent to and has space for fluid such as air to pass sealingly to a port of the microvalve assembly so that when the appliance is activated, the microvalve assembly operates as presented herein, and the one or more cells are prevented from losing active ingredients when the appliance is turned off, and yet powers the appliance with fluid entering the cell or cells. The embodiments of the invention with various options and features can be integrated with this latter design of the cell designed to be dropped into the appliance having the microvalve assembly, and corresponding appliance design. Similarly, in one preferred embodiment more than one cell can share the same control unit, and in another preferred embodiment each cell can have a separate control unit. In other preferred embodiments, control units can be located within on or on the battery housing, or at least portions of the control units can be mounted on a portion of an appliance in which the battery is installed.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. An electrochemical cell, comprising a housing comprising one or more fluid inlet apertures, a negative electrode, a fluid consuming positive electrode, and at least one microvalve assembly operatively connected to said one or more fluid inlet apertures for controlling passage of fluid to the fluid consuming positive electrode, wherein said microvalve assembly comprises:
   (a) a stationary microvalve body having at least one inlet aperture;
   (b) a first movable microactuator having at least two deposited layers being capable of moving between a first position and a second position, said first moveable actuator cooperating with a spring-like shape-retaining aperture cover that changes shape when pressure is applied to one side of said spring-like shape-retaining aperture cover, and said aperture cover disposed in a first occluding position to preclude entry of fluid through at least one of said one or more fluid inlet apertures;
   (c) upon activation of said first movable microactuator, said first movable microactuator applies pressure to said aperture cover and said aperture cover is caused by such pressure to snap from said first occluding position to a second position where said second position allows fluid to pass through said at least one of said at least one fluid inlet apertures;
   (d) a second movable microactuator having a multi-layer actuator having at least two deposited layers which can apply pressure to said aperture cover and cause said aperture cover to snap to said first occluding position;
   (e) said microactuators being connected to said microvalve body;
   (f) said at least one microvalve assembly having control circuitry, which control circuitry, upon demand for current from said cell, causes said first microactuator to move and to cause said spring-like shape-retaining aperture cover to snap from said first position to said second position thereby permitting fluid to flow to said cell, including through said at least one inlet aperture, after which movement, said first microactuator is deactivated, and after demand for current ceases from said cell, said control circuitry activates said second microactuator and causes said spring-like shape-retaining aperture cover to snap from said second position to said first position where fluid cannot pass through said at least one of said one or more fluid inlet apertures, after which said second microactuator is deactivated.

2. The electrochemical cell according to claim 1, further comprising:
   a potential sensor for sensing when chemical activity of a particular electrode is low, and delaying said control circuitry from activating said second microactuator after demand for current ceases from said cell until said chemical activity rises to a pre-determined level.

3. The electrochemical cell according to claim 1, further comprising:
   a fluid sensor for sensing when the concentration of depolarizing fluid in said cell is low, and delaying said control circuitry from activating said second microactuator after demand for current ceases from said cell until the depolarizing fluid for said cell rises to a pre-determined level.

4. The electrochemical cell according to claim 1, further comprising:
   an oxygen sensor for sensing when cell oxygen is low, and delaying said control circuitry from activating said second microactuator after demand for current ceases from said cell until cell oxygen rises to a pre-determined level.

5. The electrochemical cell according to claim 1, further comprising:
   said spring-like shape-retaining aperture cover being a belleville valve.

6. The electrochemical cell according to claim 1, further comprising:
   said spring-like shape-retaining aperture cover being a flat spring.

7. The electrochemical cell according to claim 1, wherein said cell is an air-depolarized or air-assisted cell.

8. The electrochemical cell according to claim 1, wherein said microvalve assembly is disposed within the cell housing.

9. The electrochemical cell according to claim 1, wherein said microvalve assembly is disposed on and exterior to said housing.

10. The electrochemical cell according to claim 1, wherein said cell is capable of installation in an appliance in which said microvalve assembly is mounted and said microvalve assembly in said appliance cooperates with said cell to alternately occlude and admit depolarizing fluid to said cell.

11. The electrochemical cell according to claim 1, further comprising:
    said cell being an alkaline electrolyte cell; and
    wherein the polarity of said microvalve assembly is positive.

12. An electrochemical cell, comprising a housing comprising one or more fluid inlet apertures, a negative electrode, a fluid consuming positive electrode, and a microvalve assembly operatively connected to said one or more fluid inlet apertures for controlling passage of fluid to the fluid consuming positive electrode, wherein said microvalve assembly comprises:
    (a) a stationary microvalve body having at least one inlet aperture;
    (b) a first movable microactuator having at least two deposited layers being capable of moving between a first position and a second position;
    (c) a second movable microactuator having a multi-layer actuator having at least two deposited layers being capable of moving between a first inactivated position and a second activated position;
    (d) a flat spring aperture cover covering at least one of said one of more fluid apertures;
    (e) said flat spring aperture cover being disposed to be moved from a first position to a second position, and cooperating with said second movable microactuator to be secured from returning to said first position of said flat spring aperture cover when said second moveable microactuator is in its first inactivated position;
    (e) said microactuators being connected to said microvalve body;
    (f) said microvalve assembly having control circuitry, which control circuitry, upon demand for current from said cell, causes said second microactuator to move and upon such movement, causes said first microactuator to activate and move said flat spring aperture cover, thereby permitting fluid to flow to said cell through at least one of said one or more fluid inlet apertures, and upon such movement of said flat spring, said control circuitry causes said second microactuator to cease its activation, thereby retaining said flat spring aperture cover in said second position, after which said first microactuator is deactivated; and (g) further, after demand for current ceases from said cell, said control circuitry activates said second microactuator thereby releasing said flat spring aperture cover to return to said first position of said flat spring aperture cover where fluid cannot pass through said one or more fluid inlet apertures.

13. The electrochemical cell according to claim 12, further comprising:

a potential sensor for sensing when chemical activity of a particular electrode is low, and delaying said control circuitry from activating said second microactuator after demand for current ceases from said cell until said chemical activity rises to a pre-determined level.

14. The electrochemical cell according to claim 12, further comprising:

a fluid sensor for sensing when the concentration of depolarizing fluid in said cell is low, and delaying said control circuitry from activating said second microactuator after demand for current ceases from said cell until the depolarizing fluid for said cell rises to a pre-determined level.

15. The electrochemical cell according to claim 12, further comprising:

an oxygen sensor for sensing when cell oxygen is low, and delaying said control circuitry from activating said second microactuator after demand for current ceases from said cell until cell oxygen rises to a pre-determined level.

16. The electrochemical cell according to claim 12, further comprising:

said flat spring aperture cover being a flat spring strip.

17. The electrochemical cell according to claim 12, wherein said cell is an air-depolarized or air-assisted cell.

18. The electrochemical cell according to claim 12, wherein said microvalve assembly is disposed within the cell housing.

19. The electrochemical cell according to claim 12, wherein said microvalve assembly is disposed on and exterior to said housing.

20. The electrochemical cell according to claim 12, wherein said cell is capable of installation in an appliance in which said microvalve assembly is mounted and said microvalve assembly in said appliance cooperates with said cell to alternately occlude and admit depolarizing fluid to said cell.

21. The electrochemical cell according to claim 12, further comprising:

said cell being an alkaline electrolyte cell; and wherein the polarity of said microvalve assembly is positive.

* * * * *